(12) United States Patent
Young et al.

(10) Patent No.: US 6,904,083 B2
(45) Date of Patent: Jun. 7, 2005

(54) DSL LINK WITH EMBEDDED CONTROL AND MULTI-CHANNEL CAPABILITY

(75) Inventors: Whu-Ming Young, Palo Alto, CA (US); Ming-Kang Liu, San Jose, CA (US)

(73) Assignee: PCTEL, Inc., Chicago, IL (US)

( * ) Notice: Subject to any disclaimer, the term of this patent is extended or adjusted under 35 U.S.C. 154(b) by 0 days.

(21) Appl. No.: 10/054,327

(22) Filed: Nov. 13, 2001

(65) Prior Publication Data

US 2002/0080869 A1 Jun. 27, 2002

Related U.S. Application Data

(63) Continuation of application No. 09/255,235, filed on Feb. 22, 1999, now Pat. No. 6,345,072.

(51) Int. Cl.[7] .................................................. H04B 1/38
(52) U.S. Cl. ........................ 375/222; 375/257; 375/260
(58) Field of Search ................................ 375/219, 220, 375/222, 257, 296, 346, 260; 370/236.1, 294, 468, 485, 498, 561; 701/1, 126, 129; 710/1, 305

(56) References Cited

U.S. PATENT DOCUMENTS

| | | | | |
|---|---|---|---|---|
| 4,999,834 A | * | 3/1991 | Leo et al. ................... 370/241 |
| 5,297,231 A | | 3/1994 | Miller | |
| 5,408,260 A | * | 4/1995 | Arnon ........................ 725/106 |
| 5,475,691 A | | 12/1995 | Chapman et al. | |
| 5,680,394 A | * | 10/1997 | Bingham et al. ........... 370/294 |
| 5,724,413 A | | 3/1998 | Suffern et al. | |
| 5,832,387 A | * | 11/1998 | Bae et al. ................... 455/522 |
| 5,835,787 A | | 11/1998 | Raffman et al. | |
| 5,852,631 A | | 12/1998 | Scott | |
| 5,870,046 A | | 2/1999 | Scott et al. | |
| 5,931,929 A | * | 8/1999 | Tran et al. ................... 710/69 |
| 5,960,036 A | | 9/1999 | Johnson et al. | |
| 5,970,066 A | | 10/1999 | Lowry et al. | |
| 6,016,311 A | | 1/2000 | Gilbert et al. | |
| 6,049,531 A | * | 4/2000 | Roy ....................... 370/395.53 |
| 6,055,268 A | * | 4/2000 | Timm et al. ................. 375/229 |
| 6,058,427 A | | 5/2000 | Viswanath et al. | |
| 6,072,783 A | | 6/2000 | Riley | |
| 6,128,317 A | | 10/2000 | Mackre | |
| 6,145,039 A | | 11/2000 | Ajanovic et al. | |
| 6,175,884 B1 | | 1/2001 | Harriman et al. | |
| 6,216,170 B1 | | 4/2001 | Giovannoni et al. | |
| 6,256,697 B1 | | 7/2001 | Ajanovic et al. | |
| 6,269,103 B1 | | 7/2001 | Laturell | |
| 6,269,156 B1 | | 7/2001 | Matt et al. | |
| 6,272,563 B1 | | 8/2001 | Ajanovic et al. | |
| 6,529,479 B1 | * | 3/2003 | Suzuki ..................... 370/236.1 |
| 2001/0014927 A1 | | 8/2001 | Chang et al. | |

FOREIGN PATENT DOCUMENTS

| WO | WO 99/18754 | 4/1999 |
|---|---|---|
| WO | WO 00/19308 | 4/2000 |
| WO | WO 00/19617 | 4/2000 |

OTHER PUBLICATIONS

Alcatel, Data Sheet for MTC–20144, "Integrated ADSL CMOS Analog Front–End Circuit," Rev. 1—Dec. 1998, pp. 1–24.

* cited by examiner

Primary Examiner—Chieh M. Fan
(74) Attorney, Agent, or Firm—Farjami & Farjami LLP

(57) ABSTRACT

A digital communications link, protocol and related circuits are provided which use an embedded control channel for transferring control information between different sections of an xDSL system, including within a personal computer. The control channel is included as part of a data frame structure that is suited for a multi-channel communication system, including in an xDSL communications environment.

47 Claims, 6 Drawing Sheets

Fig. 2B-(Sheet 1)

Fig. 2B-(Sheet 2)

| DSL Link Pins | Cycle 1 | Cycle 2 | Cycle 3 | Cycle 4 |
|---|---|---|---|---|
| RxData[3:0] | Control, 0, RxClav, TxClav | RxSOC, RxAddr.[2:0] | RxData[7:4] | RxData[3:0] |
| TxData[3:0] | Control, 0, RxEnb, TxEnb | TxSOC, TxAddr.[2:0] | TxData[7:4] | TxData[3:0] |

DSL LINK WITH EMBEDDED CONTROL AND MULTI-CHANNEL CAPABILITY

This application is a continuation of U.S. application Ser. No. 09/255,235, filed Feb. 22, 1999, now U.S. Pat. No. 6,345,072.

FIELD OF THE INVENTION

The invention relates generally to a digital subscriber line (DSL)-link interface and protocol for a DSL modem. The present invention has particular applicability to personal computer (PC) systems where the digital control and analog front end portions of such a DSL modem are not implemented in a single integrated circuit (IC) for various technical and cost-effective reasons.

BACKGROUND OF THE INVENTION

It has been consistent in the electronics industry that complex logic functions are integrated into smaller and smaller form factors. For instance, a popular growing trend is to combine audio and telephone capabilities in one device, including graphic and video functions in a computer chipset, and to integrate all computer peripheral functions into a single IO chip. A related general trend in the PC industry is the migration of more and more devices, components, functionality, etc. to the motherboard. This makes sense for a variety of engineering and cost reasons, including the fact that this approach conserves available conventional expansion slots on the system bus, is easier to configure, reduces the total mother board form factor and BOM cost, and preserves compatibility with legacy systems.

At the same time, there are certain components that are not optimally combined or tightly integrated together for a variety of reasons, some of which are engineering related, and some of which are regulatory related. As noted above, there is considerable interest in placing a fall scale modem down (directly on) the motherboard, to obtain the aforementioned benefits. From an engineering perspective, however, it is difficult to place the analog I/O portions of a modem directly on a motherboard because of various noise sources present on the latter. Therefore, the signal to noise ratio (SNR) performance of the modem system will decrease. Similarly, from a regulatory perspective, these analog portions of a modem must undergo a certification process in accordance with local applicable telecom rules and regulations before they can be implemented in a commercial product. If it were necessary to subject every motherboard to a new certification process (simply because it now incorporated some modem front end circuitry), this would impede and slow down the development of new products considerably.

Thus, there is a general perception in the industry at this time that, at least for the PC environment, it makes more sense to separate the analog and digital portions of a high speed modem. This has led to a proposal, authored by Intel Corporation, known as the Audio/Modem Riser Specification, in which it is suggested that the analog I/O portions of a modem be moved to a card that is physically separated but easily connected to a motherboard. Version 1.1 of this document, revised on Sep. 10, 1998, is available for downloading via the Internet at Intel's corporate web site, and is hereby incorporated by reference. In this specification, a portion of which is reproduced in FIG. 1A, it is proposed that the portions of the modem which are susceptible to noise, and which implicate certification issues, be moved to what is known as a Homologated Riser Card. This card has I/O connections to the outside world (i.e., such as to a conventional telephone line) but at the same time fits in a riser connector directly to the motherboard. As the specification indicates, this riser interface is preferably standardized, so the motherboard makers can implement audio/modem capability with lower BOM costs, and with fewer concerns about vendor proprietary variations (i.e., because there is a common footprint that can be stuffed with competing pin compatible implementations). The specification provides a detailed and comprehensive explanation of the electrical and physical requirements required to comply with the proposed standard.

Figure 1A:
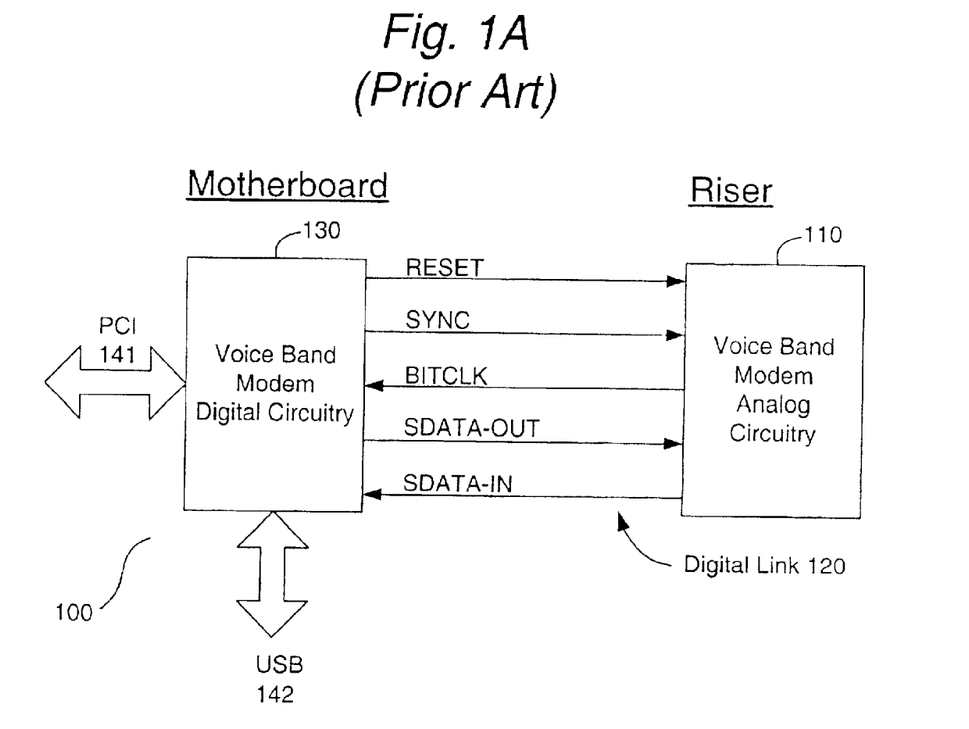
FIG. 1A is a diagram illustrating how an analog portion of a prior art voice band grade modem is mechanically placed in a riser card and electrically connected to a digital portion of such modem integrated into a computer motherboard in a personal computing system

As depicted in FIG. 1A, a modem 100 includes an analog I/O portion 110 located on a riser card 111. This analog I/O portion (sometimes referred to as a codec) is then interfaced through a digital link 120 (known as AC-97) to the digital controller 130 of the modem. The latter digital portion is located directly on a motherboard 131 and generally includes appropriate modem control circuitry, data pumps, and other functional circuits typically associated with those aspects of a modem. These functions can also be performed, for example, by a so-called host signal processing (HSP) embodiment, in which case the AC 97 digital controller (at least for the modem portions anyway) can consist of as little as a very simple bus interface. The preferred implementation for this digital portion is described in another specification published by Intel known as Audio Codec 97. Version 2.1 of this document, published on May 22, 1998, is likewise available for downloading at Intel's corporate web site, and is also hereby incorporated by reference. As noted therein, the AC97 digital controller can include a wide range of capabilities, including multiple digital audio channels, and suitable interfaces to a PCI bus, a digital $I^2S$ bus, etc.

Figure 1B:
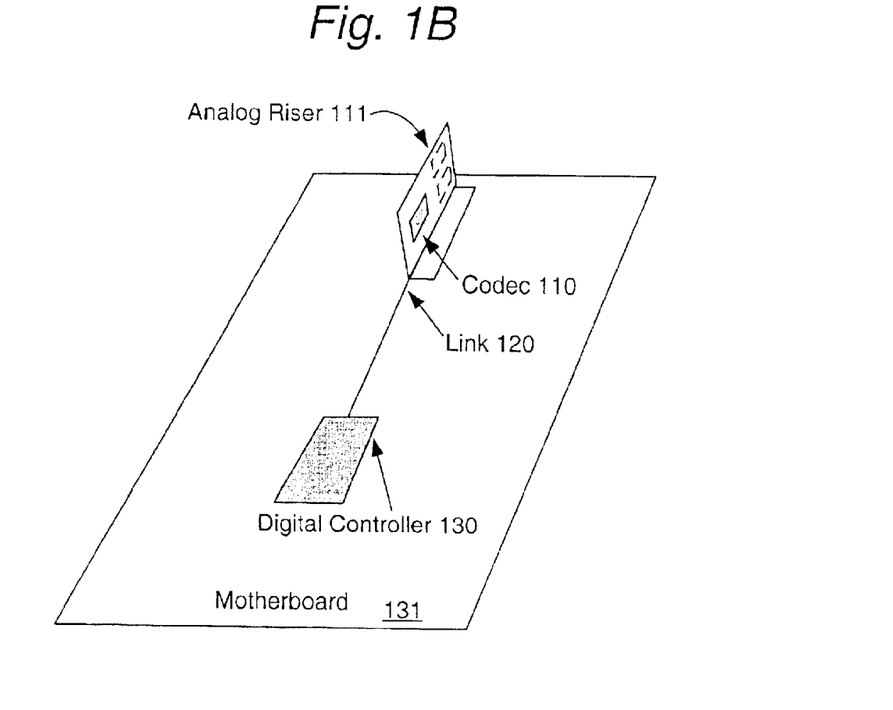
FIG. 1B is an electrical block diagram depicting the various signals carried by a prior art digital link for a voice band grade modem integrated as part of a motherboard in a personal computer system.

A description of the various I/O, control, and power/ground signals in the AC-97 link passing through the riser interface is provided at Tables 1–5 of the aforementioned A/M Riser specification. As seen generally in FIG. 1B, in a voice band modem implementation, the AC 97 link between the digital controller 130 and the analog CODEC 110 consists of a five wire, bi-directional, serial TDM format interface. The signals supported, include the following: RESET (a master hardware reset), BITCLK (12.288 MHz serial data clock), SYNC (48 KHz fixed rate sample sync), SDATA_OUT (serial, time division multiplexed input data stream to the PC), and SDATA_IN (serial, time division multiplexed output data stream from the PC). The format and nature of these signals is well-known, and is described in the aforementioned specifications. Digital controller 130 can also including suitable interfaces for other contemporary expansion busses, such as PCI bus 141, USB 142, etc.

While the A/M Riser specification is a step in the right direction, it does not provide for functionality that would permit implementation of an xDSL type modem at this time. For example, xDSL requires a much higher bit rate than that provided by the AC97 link (at a 2.2 MHz sampling and 16 bits wide for an ADSL downstream signal, the total bit rate is 35.2 Mb/s, which is much higher than the 12.288 MHz serial clock). Furthermore, there are various power and control signaling requirements in xDSL that were not foreseen by AC97. Therefore, the AC97 and A/M Riser specification are limited to supporting at most simple analog type (V.90 and the like) modems. This is a significant drawback, since xDSL technologies (and especially ADSL) are expected to be in widespread use in a very short time.

SUMMARY OF THE INVENTION

Accordingly, it is a general object of the present invention to overcome the aforementioned problems.

Another object of the present invention, is to provide a DSL modem which is configurable as a motherboard device within a personal computing system, in a manner similar to that only currently possible for voice band type modems;

A related object of the present invention is to provide a DSL modem that has analog codec circuitry and digital controller circuitry both tightly coupled to a PC motherboard, in a manner similar to that only current provided for voice band type modems;

Another object of the present invention is to provide a DSL interface that can properly handle DSL data rates, DSL control signals, and other xDSL related signal requirements so that it is suitable for linking the analog and digital portions of a DSL modem of the aforementioned type;

A related object of the present invention is to provide a DSL interface that is extremely flexible, and can be used in any one of a number of different xDSL technologies, including HDSL, SDSL, ADSL, reduced rate ADSL, etc.;

Another object of the present invention is to provide an improved signal protocol for a DSL link, having data/control word formatting and timing specifications especially suited for a DSL data stream;

A further object of the present invention is to provide a DSL interface that minimizes the required signal and power pins associated with a standardized specification for analog codec components in a personal computing system, and is therefore cost effective, and can be easily integrated by system vendors;

Yet a further object of the present invention, is to provide a DSL digital controller and a DSL codec which can utilize the above novel DSL interface;

An additional object of the present invention, is to provide a personal computer motherboard which is adapted to use the aforementioned DSL modem and DSL interface.

Another object of the present invention is to minimize the required logic complexity in order to support all above functions and features.

These and other objects are effectuated by the following aspects of the present invention.

An improved digital communications link of the present invention connects a digital controller Section of an xDSL modem—which is preferably located on a system motherboard of a computing system—to a separate analog section of the xDSL modem—which is located at a position substantially free of electronic noise from other electronic components on said motherboard, which could materially affect the operation of such analog section. The data path/link is generally configured in the following manner: (a) a plurality of receive signal lines are set up for receiving data from a remote site; (b) a plurality of transmit signal lines are designated for transmitting data to a remote site; (c) a bit clock signal line is set up for carrying a clock signal, which clock signal is used in connection with communicating the data to and from the remote site. The bit clock signal line can carry any desired clock signal needed according to data transmission requirements of said digital communications link, thus providing a scalable interface that is easily adaptable for use in any number of different motherboard environments.

An additional word clock signal, derived from the bit clock signal, marks the boundary for each sample word received or transmitted on said plurality of receive signal lines and/or plurality of transmit signal lines respectively.

Another aspect of the present invention includes the use of an improved protocol for exchanging operational and/or control information between separated digital and analog sections of an xDSL modem. This operational and/or control information preferably includes information relating to real time control settings for circuits located within the analog codec, power management, and the like.

During normal operation, the aforementioned receive and/or transmit signal lines can also be used for carrying control words for use by the xDSL modem, which control words are embedded as part of the normal data stream. As a compromise between flexibility and speed, these control words preferably have either a first or second length. The control word has a start bit, followed by a length indicator bit, and then the set of command bits corresponding to the actual command/data value. Idle bits are transmitted continuously between control words. Unlike prior art schemes, the control words are transmitted asynchronously, therefore, in an embedded operations channel (EOC) that has an effective rate equal to the word clock signal.

According to another useful feature of the present invention, the aforementioned link also includes provision for setting up a multi-channel data frame. In this way, two or more data channels can be set up between the digital controller and analog section, with data transferred through a first channel during a first time period of the multi-channel data frame, and through a second channel during a second time period of the multi-channel data frame. To accomplish this, the word clock signal can be adapted to have a different duration for different number of data channels. In one variation, the data channels can have different transmit and/or receive data rates, so as to accommodate multiple codecs, or unequal receive/transmit data stream bit rates (such as ADSL). Accordingly, the single channel limitation of the prior art can be also be overcome by this capability of the present invention.

Yet another useful aspect of the present invention provides that, due to the unique selection of receive/transmit/clock lines and signal protocols, the same receive and/or transmit signal lines can also be used to support a compatible data interface between the digital controller and an ATM based hardware xDSL modem. In other words, the data path can handle ATM packaged data and clocking information, making it extremely versatile and useful for incorporation within a motherboard application.

These aspects of the present invention thus permit an xDSL motherboard, and an xDSL modem to be configured in a manner similar to a voice-band modem.

A computer motherboard, DSL digital controller, DSL codec, and DSL modem of the present invention include otherwise conventional hardware (and/or software in an HSP application) and are all implemented with appropriate interface circuitry and control logic necessary to effectuate the above architecture, characteristics and functionality of the aforementioned DSL link.

Although the inventions are described below in a preferred embodiment associated with a personal computing system, it will be apparent to those skilled in the art the present invention would be beneficially used in any environment where it is desirable to link separated analog/digital portions of an xDSL modem.

DETAILED DESCRIPTION OF THE INVENTION

DSL Modem System Overview

Figure 2A:
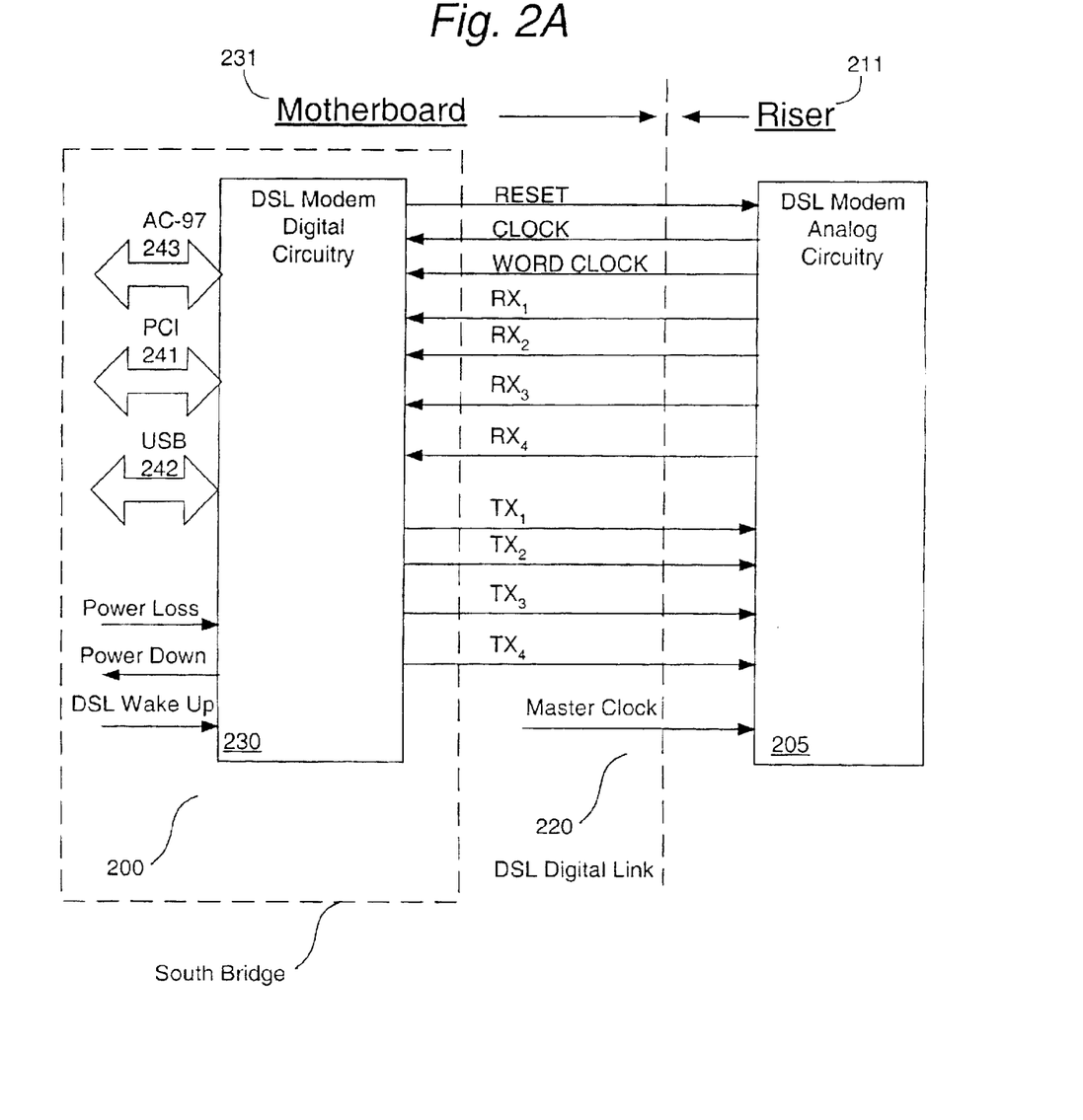
FIG. 2A is a functional block diagram of a preferred embodiment of a DSL digital link, DSL modem, and motherboard of the present invention.
Figure 2B:
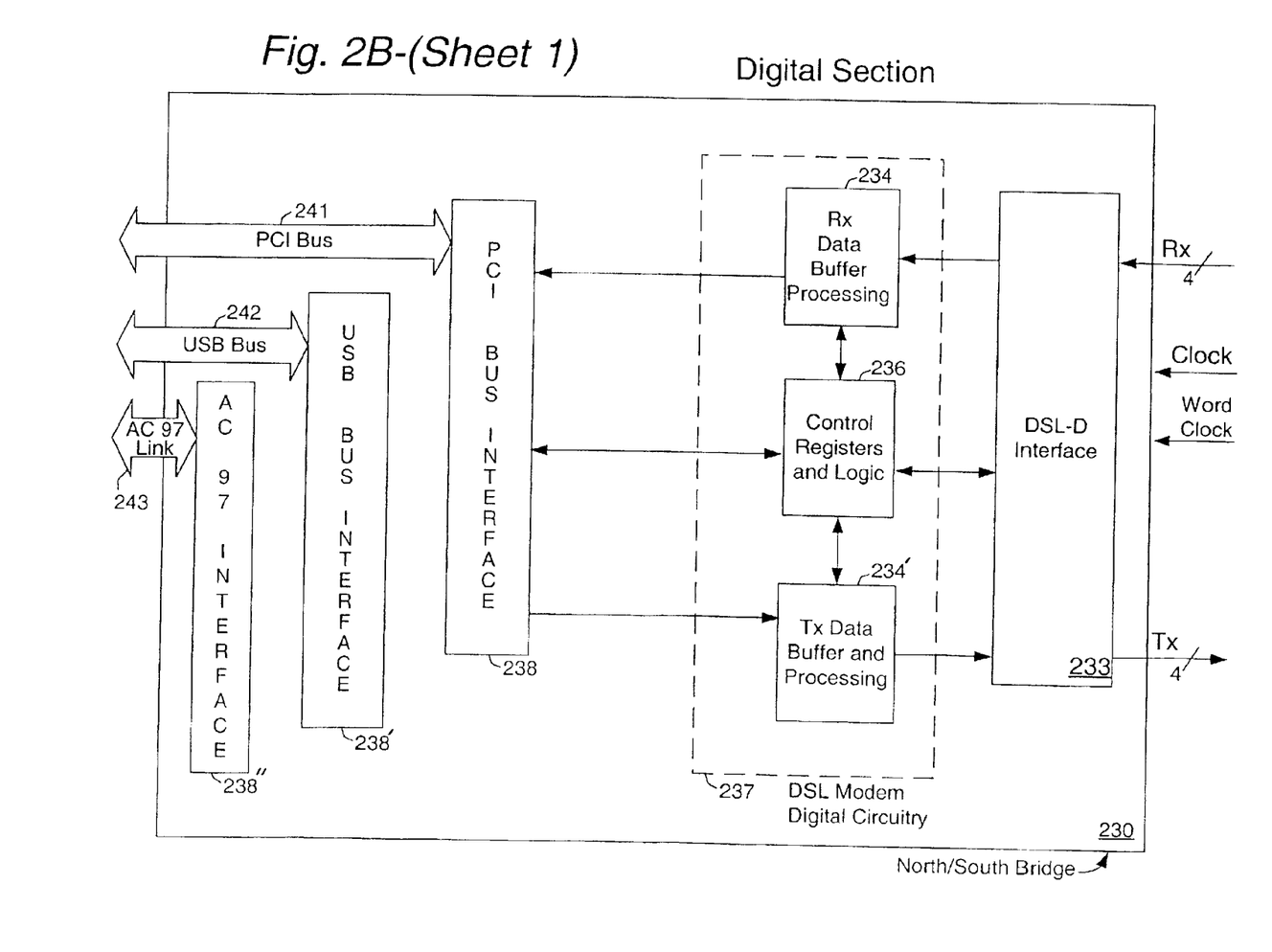
FIG. 2B is a more detailed functional block diagram of the portions of the circuitry illustrated in FIG. 2A.

A preferred embodiment of the present invention is depicted generally in FIGS. 2A and 2B. This embodiment is similar in some respects to the prior art voice band modem implementation shown in FIG. 1, and, for that reason, like components/circuits are designated with like numerals. In FIG. 2A, an xDSL modem 200 as shown consists of two physically separated (but electrically coupled) circuitry sections, a DSL Modem Analog Circuit 205, and a DSL Modem Digital Circuit 230. Except for those portions necessary for implementing the xDSL digital link of the present invention, the specifics of these two circuitry sections are well known in the art, and any suitable hardware/logic/firmware combination could be used for effectuating the typical functions of an xDSL modem. For example, DSL Modem Analog Circuit 205 is typically a combination of a codec and various analog components necessary to support an xDSL link. It will be apparent to those skilled in the art that portions of DSL Modem Analog Circuit 205, as well portions (or even all) of DSL Modem Digital Circuit 230 may be implemented in single chip (IC) form either alone or in combination with a larger functional device. With reference to FIG. 2A again, DSL Modem Digital Circuit 230 includes circuitry for performing some of the necessary signal processing associated with an xDSL link, data buffering, and host interface functions. Additional control logic sets up and maintains the xDSL compatible data link by responding to appropriate commands from the host. It also receives hardware status such as power loss detection from the DSL Analog Circuit 205 via the DSL link and passes this information forward to the host for necessary actions.

Various software drivers associated with the operating system can interact with DSL Modem Digital Circuit 230 through various available system busses such as a PCI Bus to ensure proper data flow between such circuit and applications running on a host system. In a typical PC system, the functions performed by DSL Modem Digital Circuit 230 is embodied as part of a PCI Bus Controller chipset, such as those known in the art as either South Bridge or North Bridge. The purpose of this integration is to increase system integration flexibility and to reduce BOM costs. Thus, for purposes of the present discussion, DSL Modem Digital Circuit 230 is also generally referred to herein as a DSL Digital IC, and this IC can be integrated alone as a standalone device, or, as noted immediately above, as part of a PCI North/South Bridge IC. In additional to DSL link, this overall chip may contain additional various interfaces such as a PCI bus 241, USB bus 242, and AC-Link 243. Furthermore, it may generate additional control signals such Wake Up to the host for various modem operation needs. Other system controller functions (CPU, memory and PCI agent related) normally performed by such PCI Bus Controller chipset can be implemented in any conventional, well-known fashion.

In general, the hardware, firmware, software, and logic for performing the above functions in DSL Modem Digital Circuit 230 is dependent on the functions performed in DSL Modem Analogy Circuit 205. For example, when oversampling is used in A/D and D/A, the digital filters for interpolation and decimation filters can be done on either side of the DSL link. Therefore, for purposes of the present invention, the actual implementation of DSL Modem Digital Circuit 230 and Digital Modem Analog Circuit 205 can be accomplished through a number of variations that are compatible with the teachings herein. In many cases, as just described in connection with the filtering function, various signal processing or logic operations can be effectuated on either side of the link with no loss of performance or flexibility. The present invention, in fact, specifies a universal DSL link interface that allows a very flexible implementation for the two blocks and for future DSL technologies.

DSL Analog Section Overview

FIG. 2B provides a more detailed electrical schematic illustration of the components shown generally in FIG. 2A. As shown, a DSL Analog Modem Circuit 205 is connected to a phone line through a hybrid circuit 207 and processes the received signal through a receive amplifier 209, filter 211, A/D 213, and, in embodiments where filtering is implemented on this side of the modem, a post digital filter 214. A ring detect circuit 212 is used to detect a remote wake up signal, which is some pre-designated xDSL signal. This wake up signal is passed on where it used, for example, to re-activate portions of the DSL modem and a host PC incorporating the same. A series of transmission counterpart stages are also shown in FIG. 2B, including a digital filter 214' (optional as noted above), D/A circuit 213', and a transmit amplifier and driver stage 211', for generating the xDSL analog transmit signal to the phone line through the hybrid. Also associated with DSL Analog Modem Circuit 205 is a DSL link interface block DSL-A 216, which transmits signals in the DSL link to DSL Digital Modem Circuit 230, and converts received signals in the DSL link to various data and control signals for the internal circuits within DSL Analog Modem Circuit 205, including control registers 215. Also inside DSL-A 216 is a clock circuit (not shown) which generates the necessary clocks for internal blocks and external DSL link based on an input from a System Master Clock as shown. Again, some or all of the functions of DSL Analog Modem Circuit 205 may be grouped and implemented in single chip form. For example, DSL-A codec 218, incorporating control registers 215, DSL-A Interface 216, digital filters 214, 214', and A/D 213 and D/A 213' is preferably embodied in a single integrated circuit (IC), and a separate IC is preferably used to embody analog front end Sections (i.e. receive/transmit drivers 209, 209' and receive/transmit filters 211 and 211').

It should be emphasized that the above description is only a typical embodiment of DSL Analog Modem Circuit 205 suitable for use with the present invention, and that other variations of an analog codec circuit will be apparent to those skilled in the art. Other voice modem related functions can also be incorporated in this stage, as noted in the aforementioned Intel specifications noted above.

To improve transmission performance against various noise sources from the PC motherboard and coupled to the components in the analog front end (AFE) section, DSL Modem Analog Circuit 205 can be physically placed in a separate printed circuit board (PCB) or riser card 211. This provides maximum noise isolation from DSL Modem Digital Circuit 230. This approach is similar to that done in the prior art for analog modems. Note that it is not necessary in all cases that DSL Modem Analog Circuit 205 be placed on a separate riser card 211, but it is important that such circuitry be isolated in some fashion so that it is substantially free from electronic noise that could impair its performance. Accordingly, DSL Modem Analog Circuit 205 could conceivably still be mounted on the same motherboard 231 as DSL Modem Digital Circuit 230, so long as the former is sufficiently isolated from other motherboard noise sources. As an example, a small isolating enclosure, shielding cage, or even insulative layer coatings might be used to protect and shield portions of DSL Modem Analog Circuit 205 from EMI and other noise, and this could result in smaller displacements between the analog and digital sections of an xDSL modem. Other appropriate manifestations will be apparent to those skilled in the art.

DSL Digital Section Overview

On the other side of DSL Link 220 is DSL Modem Digital Circuit 230, which includes a counterpart DSL-D Interface 233. As noted earlier, DSL Modem Digital Circuit 230 is preferably implemented as a single DSL Digital IC integrated within a South/North bridge controller within a PC system. The functions performed by this circuit include I/O transfers between a PC host and DSL Analog Circuit 205. Depending on the specific DSL implementation, part of the data pump functions can be done inside Receiver Buffer and Processing 234 and Transmitter Buffer and Processing 234'. For example, DSL functions such as IFFT and FFT can be performed by 234' and 234, respectively. DSL-D Interface 233 interacts with and is responsible for coordinating data/control signals on the digital side of DSL Link 220. As with its counterpart on the analog side, DSL-A Interface 216, this circuit performs data conversion and control signaling via DSL Link 220. To interface with the PC host and various peripheral devices, DSL Digital IC 230 may also include various bus connections and interfaces. These include PCI Bus 241 and associated PCI Bus Interface 238 to the PC host, USB 242 and USB Interface 238' to external USB devices, and AC-Link 243 and DC97 Interface 238" to external audio and analog modem codecs.

Again, it should be mentioned that the above description for the Digital IC 230 is but one typical embodiment for use with the present invention in a PC system, and that other variations of the same will be apparent to those skilled in the art. As noted earlier, some of the functions performed in DSL Digital IC 230 can instead be implemented on the analog side, and vice-versa.

As noted above, functions performed by Transmitter Buffer and Processing 234' and Receiver Buffer and Processing 234 depend on the specific xDSL implementation. In the case of host signal processing, where the present invention can be used for great benefits, only minimal functions need be performed inside 234 and 234'. Instead, most xDSL functions are performed by the host CPU. The degree of integration of such functions by a CPU are, of course, a function of the available MIPs for performing the same. While it is not practical or economical at this time to implement a full rate ADSL data pump with contemporary CPU technologies, it is nevertheless quite possible to achieve reduced rate ADSL functionality (i.e., such as that specified by the proposed ITU-T G.992.2 standard) in a PC in most cases by utilizing the teachings of applicants' prior disclosures, including in Ser. Nos. 08/884,895 and 08/884,957 which are hereby incorporated by reference. Thus, the hardware needed to implement DSL Digital IC 230 can be extremely inexpensive (simple interface circuitry) and cost-effective for a motherboard manufacturer.

DSL Link Specification/Protocols

A DSL link 220 couples DSL Modem Analog Circuit 205 to DSL Digital IC 230 through DSL-A Interface 216 and DSL-D Interface 233 respectively. This link includes a $RX_1$–$RX_4$; four (4) transmit data lines $TX_1$–$TX_4$; a variable rate bit clock signal (CLOCK); a word clock signal (WORD CLOCK) to show the word boundary for each sample; and a reset signal (RESET) from the DSL Digital IC 230 to reset the DSL Modem Analog Circuit 205. These signals are explained in detail below. As can be seen, the applicants have carefully evaluated and calculated an optimal set of data/control lines and signal formatting to minimize the total number of pin assignments and maximize the usability for various xDSL requirements.

Receive data lines $RX_1$–$RX_4$ carry digital samples generated by A/D 213 and assembled and transmitted across the link by DSL-A Interface 216; DSL-D interface 233, conversely dis-assembles and passes these samples on for further signal processing. requires a high clocking rate) and a fully parallel approach (which minimizes the clock rates but requires more driving power and a higher pin count). This compromise approach has the following advantages: (1) since xDSL signals are broadband signals, it minimizes clock frequencies and consequently device power consumption, (2) it reduces the total pin count to an acceptable level, (3) it provides an embedded channel for control signaling (explained shortly), and (4) enables various features such as using the same DSL link 220 as a logically equivalent Utopia interface (explained shortly).

For the same reasons, four (4) transmit data lines $TX_1$–$TX_4$ carry digital samples from DSL Modem Digital Circuit 220 assembled by DSL-D Interface 233 into suitable form where they are then received and dis-assembled by DSL-A Interface 216 and processed by D/A converter 213' in DSL Modem Analog Circuit 205 to generate the analog transmit xDSL signal. Signal line RESET is activated when the PC host tries to reset DSL Modem Analog Circuit 205; this can occur, for example, when the xDSL modem must be initialized or re-initialized.

Signal line CLOCK carries a scalable rate clock signal, $f_{clock}$ generated by the clock generator inside DSL-A 216, which can be any suitable and well-known conventional clocking circuit. For a given xDSL link of signal frequency bandwidth B, oversampling factor P, up to 15 bits per sample, $f_{clock}$ is given by:

$$f_{clock}=2*B*P*16/4$$

In a preferred embodiment, a sample word consists of 16 bits: 1 control bit and up to 15 sample bits. Therefore, the period of the signal line WORD CLOCK consists of four (4) serial clock periods. That is, $$f_{wc}=f_{clock}/4$$

Unlike the prior art fixed clock rate signaling, the clock signal rates for CLOCK and WORD CLOCK will vary depending on the particular DSL link in place. The present DSL Digital Communication Link 220 does not impose any restriction on the clock rate, since it is expected that such should be scalable in a manner that supports a wide range of potential options for an xDSL modem in a personal computing system. In other words, this variability for the clock rate provides system motherboard manufacturers with the ability to mix and match compatible combinations of digital and analog xDSL modem components without concern about the available clocking rate across the connecting interface. This optimizes options for both motherboard suppliers, and xDSL modem component vendors, since they only need to ensure that they are matching combinations of hardware that are otherwise compatible. For example, in an ADSL modem application, the T1.413 issue 2 standard calls for a full downstream (Nyquist) sampling rate of 2.2 MHz, where the signal bandwidth B is 256 tones*4.3125 kHz/tone=1.1 MHz. With P being 4× oversampling, CLOCK and WORD CLOCK are 35.328 and 8.832 MHz, respectively. The only important consideration, therefore, is to make certain that the particular DSL Digital IC 230 can support this clock rate in conjunction with the selected DSL Modem Analog Circuit 205. In this respect, therefore, DSL Digital Communications Link 220 supports a scalable clock rate that is based purely on the desired price and performance objectives of a system vendor. To flexibly adjust the clock rates, the external Master clock can be divided by a programmable value specified in a register inside DSL-A Interface 216, which can be set up by the host through the control channel embedded in the DSL Link 220 (explained shortly).

To reduce the total pin count in DSL Link 220, the same CLOCK and WORD CLOCK are used by the corresponding interfaces (DSL-A 216 and DSL-D 233) for both transmit and receive data.

Figure 3A:
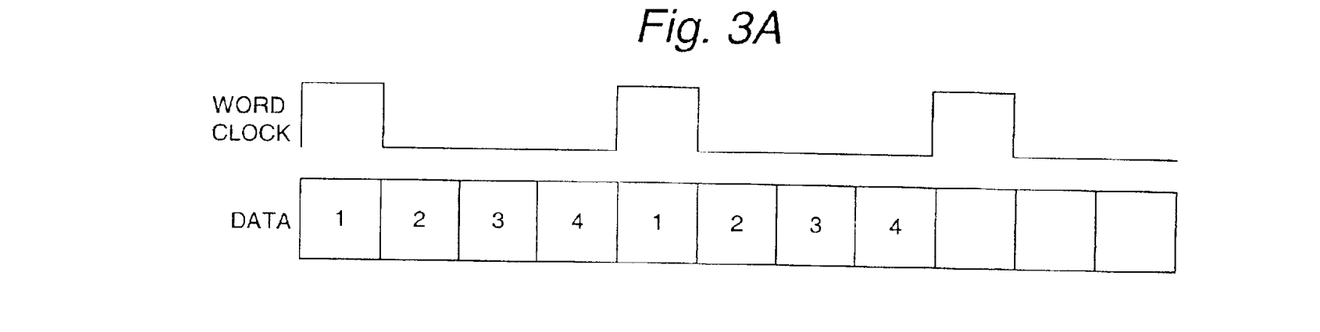
FIGS. 3A–3C are preferred embodiments of timing specifications, data formatting, and control signal protocols used in the DSL link of the present invention.

The word clock rate, $f_{wc}$, provides timing for transmit and receive data samples. As illustrated generally in FIG. 3A, each pulse in the WORD CLOCK represents the beginning of a sample word. As shown, four sampling CLOCKs are used in a word period. This allows up to 16 bits (4 lines*4 cycles) per sample word, In a typical DSL application, a high speed codec will not require more than 15 bits per sample. Accordingly, the present scheme accommodates even the expected worst case for an xDSL modem by setting 16 bits per WORD CLOCK period, in which at least one of these bits can be designated for control signaling. Of course, while the preferred embodiment herein utilizes the specified clocking format discussed above, and an accompanying set of four data transmission lines, other combinations of these parameters will be apparent to those skilled in the art from the present teachings. Accordingly, the present invention is not limited to any one particular combination of such parameters.

As mentioned above, the present invention also provides capability for communicating operational and/or control information easily and flexibly between the analog and digital sections of modem 200. This can be seen in FIG. 3B which illustrates how at least one operational control bit (D15) is reserved or allocated for an embedded operation channel (EOC). The EOC can be used, for example, for passing the following types of information across the link.

Figure 3B:
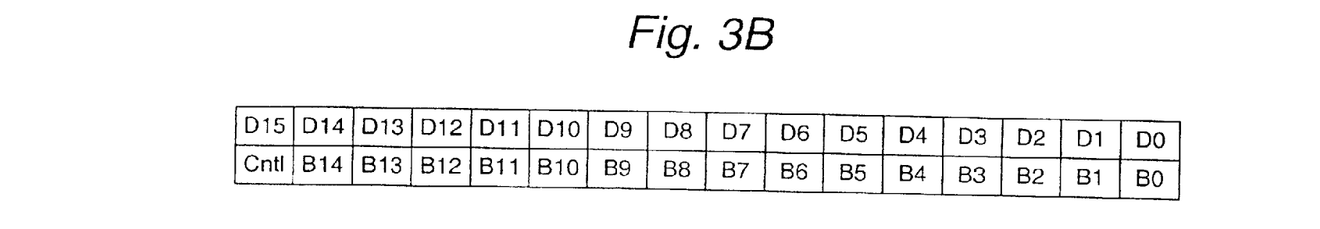

(1) transmitter/receiver gains;
(2) interrupts to the Digital IC 230;
(3) information to control VCXO in DSL Modem Analog Circuit 205 for timing recovery;
(4) power management information, such as an ADSL wake-up signal, or a power loss signal received by DSL Digital IC 230 from the motherboard. The power loss signal from the motherboard, in the case of ADSL, is used by DSL Modem Digital Controller 230 for generating a dying gasp message to be transmitted to a remote transceiver through DSL Modem Analog Circuit 205. Other types of control information associated with a conventional xDSL link can also be accommodated.

It can be observed from FIG. 3B that EOC has an effective bit rate equal to the word clock. The present invention, therefore, provides a method for providing control signaling information that does not require a separate time division multiplexed control word sent over the link as is done in the aforementioned AC97 prior art data link. This operational information is encoded by DSL-D Interface 233 into the data stream using any suitable logic, and is then decoded and acted upon by corresponding logic in DSL-A Interface 216 so that, for example, suitable adjustments are made to digital filters 214, 214', A/D 213, D/A 213', and amplifier and filter stages 209, 209' and 211, 211' respectively. This operational information can be passed in both directions across the link so that control registers 215 within DSL Analog Circuit 205 can be read or configured in any desired manner by DSL Digital IC 230. Conversely, if desired, information concerning data and settings of control registers 235 within DSL Digital IC can be monitored and changed by control logic in DSL Analog Circuit 205.

Preferably, control information (i.e., control data or control data addressing) in the EOC is presented in asynchronous form in a manner analogous to that used in a conventional PC serial port or RS232 to simplify logic design. This means that a start bit is set to logical 0 when there is control data, and logical 1 otherwise. After the start bit, a fixed number ($1+N_c$ or $1+2N_c$) of control bits fills out the remainder of the control word signal. To optimize the balance between short control words (to minimize delays) and long control words (improved addressing range), two different control word lengths are provided (i.e., the control word length is either $N_c$ or $2N_c$). To signal a short control word (say $N_c$=16 bits), the bit immediately following the start bit is set to a logical 0; to signal a long control word (say 32 bits) the bit immediately following the start bit is set to a logical 1. Following the set of bits for the actual control word, the EOC is then stuffed with all logical 1 values, corresponding to idle bits. Because the above architecture is relatively flexible, it is of course possible (and may be desirable in some environments) to increase the number of embedded operation channels by using an additional bit (for example D 14) of the transmit/receive data words across the link.

Additional Features in DSL Link

Variable Number of DSL Channels

Another useful aspect of the present invention is the provision in the present xDSL digital link for a variable number of channels. The aforementioned AC97 prior art can only handle a fixed number of channels (12) in the transmit/receive directions, and this is not practical for an xDSL link for a number of reasons. First, the receiving and transmitting data streams may not be operating at the same sampling clock. This will occur, for example, when there are different oversampling ratios, or where there are different signal bandwidths (e.g., ADSL) for upstream and downstream transmissions. Second, there may be multiple channels for transmission and receive directions. For instance, an echo cancellation data path might be used in some environments for echo suppression. Finally, it may be useful to support additional DSL Modem Analog Circuits 205', 205", (not shown) connected in parallel with DSL Modem Analog Circuit 205 using the same set of data signal, control and clock lines described above.

Figure 3C:
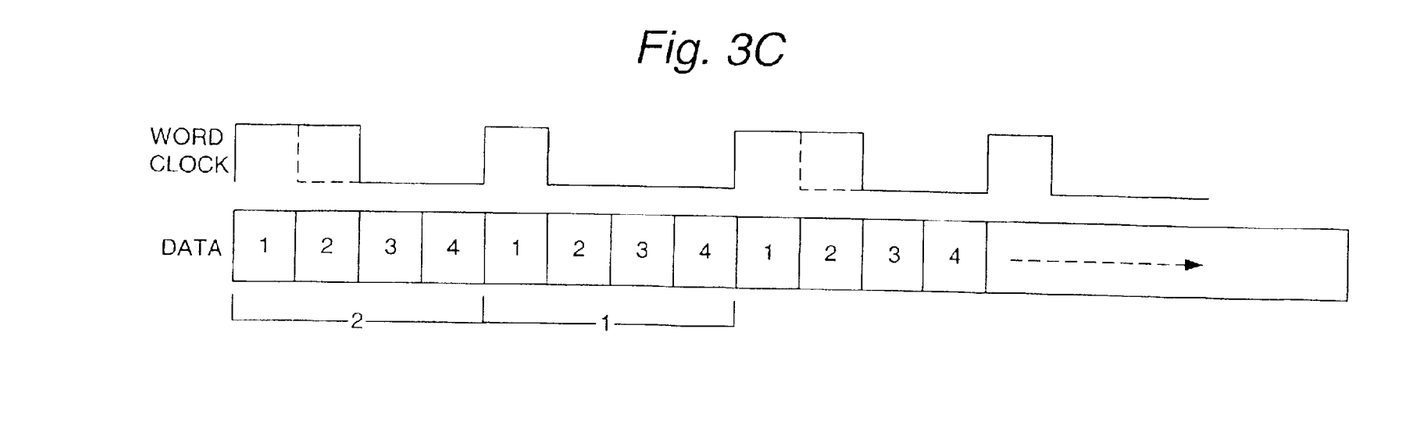

To achieve this variable number of channels capability, a frame structure for the word clock cycles is illustrated in FIG. 3C. As illustrated, a certain number M (programmable by software and set to a value of 2 as shown) of word clock cycles forms a frame clock to support M separate DSL channels (or separate analog circuits) in each direction. It is unnecessary, of course, for all M channels to be active at one time. To mark the beginning of a frame, the word clock is held high for a duration of two clock cycles. At startup, M is initially set to 1. To operate with multiple channels, DSL Digital IC 230 passes a control signal via the EOC noted earlier, to set M to some higher integer value in the DSL Modem Analog Circuit 205, such as M=2. A multi-channel frame is then indicated by WORD CLOCK being set high for two clock cycles. As depicted in FIG. 3C, the data for channel 2 (or the second DSL Modem analog circuit) is presented at the beginning of the frame cycle (i.e., when WORD CLOCK is high for two cycles) and the data for channel 1 (or the first DSL Modem analog circuit) is presented during the second half of the frame cycle (during the time WORD CLOCK is high for a single cycle). Thus, in the multi-channel data frame of FIG. 3C, there are two data channels, and data is transferred through a first channel during a first time period of the multi-channel data frame, and through a second channel during a second time period of the multi-channel data frame.

In this manner, multiple codecs can be included in DSL Modem Analog Circuits 205. As is apparent, the value for M can be programmed as necessary by DSL Digital IC 230 based on the particular DSL link requirements, the specific implementation of DSL Modem Analog Circuits 205, etc.

Furthermore, when the bit rates at the output of Digital Filters 214 and 214' have an integer relationship, the provision of multiple channels is a necessary feature. For example, in the case of ADSL where the sampling rates equal the Nyquist rates, the upstream and downstream rates are 275 kHz and 2.2 MHz, respectively (a ratio of 1:8). Therefore, the present invention allows a DSL modem to be configured with a value of M=8, thus setting up only one active channel in the upstream direction and 8 active channels in the downstream direction.

The various clocks, buffers, latches, control logic, etc., for implementing this aspect of the present invention, as well as for performing the formatting, assembling, and disassembling operations on the Rx and Tx data samples by the various DSL-A and DSL-D interfaces are well-known in the art, and therefore any suitable combination of the same which effectuates the above functionality can be used for the present invention.

Reuse of DSL Link for External Hardware DSL Implementation

Figure 4:
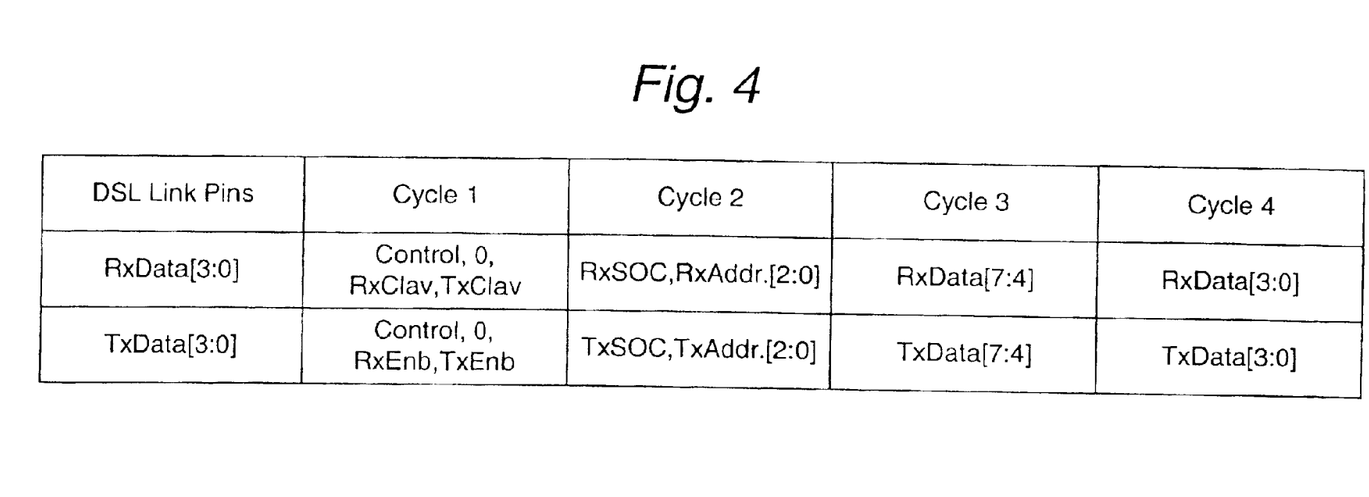
FIG. 4 is a preferred embodiment of a signal and timing protocol that can be used by the DSL link of the present invention to support an ATM interface.

As mentioned earlier, the use of DSL Link 220 is most attractive to a host based DSL modem implementation requiring minimal logic inside Digital IC 230. When the CPU in the motherboard is not fast enough, it is desirable to use the DSL Link to connect Digital IC 230 to an external hardware DSL implementation. In this case, another useful aspect of the present invention is illustrated in FIG. 4. As shown, when an external hardware solution for a DSL modem implementation exists, a reasonable interface to use with such implementation is one based on the ATM Utopia I or Utopia II interface. This is because ADSL technology has already been defined to interface with ATM in both T1.413 Issue 2 and ITU-T G.992 standards. In this configuration, DSL Digital IC 230 would be linked through DSL Digital Link 220 to a hardware based xDSL modem in FIGS. 2A and 2B, instead of interfacing directly to DSL Analog Modem Circuit 205. In such instance, of course, since most of the signal processing and control functions would be located within the hardware xDSL modem, DSL Digital Controller 230 could be simplified accordingly. The reason this is possible is because the same 10 signal lines described above ($RX_1$–$RX_4$, $TX_1$–$TX_4$, CLOCK and WORD CLOCK) can serve a dual purpose and act as an ATM interface as well. As above, for the same four sampling cycles per word clock, the following data can be transported over DSL digital link 220:

1. First clock cycle period: $RX_1$–$RX_4$ are used for Control, 0, RxClav, TxClav; $TX_1$–$TX_4$ are used for Control, 0, RxEnb and TxEnb.
2. Second clock cycle period: $RX_1$–$RX_4$ are used for RxSoc, RxAddr [2:0], while $TX_1$–$TX_4$ are used for TxSoc, TxAddr [2:0].
3. Third clock cycle period: $RX_1$–$RX_4$ are used for RxData [7:4], while $TX_1$–$TX_4$ are used for TxData [7:4].
4. Fourth clock cycle period: $RX_1$–$RX_4$ are used for RxData [3:0], while $TX_1$–$TX_4$ are used for TxData [3:01].

As defined above, the signals Control, RxClav, TxClav, RxEnb, TxEnb, RxSoc, TxSoc, RxAddr, and TxAddr are defined in the UTOPIA Specification, Level 1, Version 2.01, published Mar. 21, 1994 by the ATM Forum, and incorporated by reference herein. It can be seen from the above that an ATM type interface can also be implemented by the DSL-A and DSL-D interfaces to exploit the embedded control channel characteristics of the present digital link with great advantage.

One significant advantage of the present invention, therefore, is the fact that the DSL Digital Link 220 can be incorporated within a motherboard of a personal computing system to enable great flexibility in configuring options for an xDSL communications capability. For example, a motherboard manufacturer (or ultimate system vendor) can configure any particular base level enabled system to include any desired level of xDSL modem performance and functionality, including either a host based soft modem solution, or a pure hardware type modem solution. This is accomplished by simply stuffing the board with various combinations; for example, a simplified version of DSL Digital Controller 230 can be combined with an ATM based hardware DSP xDSL modem, or, alternatively, a configuration such as shown in FIG. 2B can be implemented for a software modem implementation. The flexibility of the data lines of the communications link, and the use of an embedded control channel, permits easy adoption of optimized solutions for any particular application.

Thus, the configuration and selection of the data signal lines, the use of an embedded control channel, the data clocking mechanism, the ability to provide multiple data channels, and the format of control words used in the embedded control channel, all contribute to making the present invention easily adaptable and usable with a number of different combinations of digital and analog circuits associated with xDSL modems.

Although the present invention has been described in terms of a preferred embodiment, it will be apparent to those skilled in the art that many alterations and modifications may be made to such embodiments without departing from the teachings of the present invention. Accordingly, it is intended that the all such alterations and modifications be included within the scope and spirit of the invention as defined by the following claims.

What is claimed is:

1. A method for transmitting data on an xDSL digital communications link between a digital controller and an analog codec located within a personal computer system, the method comprising the steps of:

(a) generating a bit clock adapted for data transmission requirements of the xDSL digital communications link; and (b) communicating the data and operational and/or control information, embedded in a plurality of words, between the digital controller and analog codec at a rate corresponding to said bit clock, wherein each of the plurality of words includes a portion of the data and a portion of the operational and/or control information, and wherein said operational and/or control information embedded in each of said plurality of words is transmitted over a plurality of data lines during a first time period corresponding to a first number of bit clock periods, and the data embedded in each of said plurality of words is transmitted over said plurality of data lines during a second time period corresponding to a second number of bit clock periods;

wherein the data and said operational and/or control information are multiplexed over said plurality of data lines.

2. The method of claim 1, wherein said operational and/or control information includes information relating to real time control settings for circuits located within the analog codec.

3. The method of claim 2, wherein said operational and/or control information further includes information relating to power management for an xDSL modem.

4. The method of claim 3, wherein said operational and/or control information is transmitted asynchronously with respect to the data.

5. The method of claim 4, wherein a start bit is used within said operational control information to indicate the beginning of a valid control data word.

6. The method of claim 1, wherein said second time period immediately follows said first time period such that the data is transmitted immediately following said operational and/or control information.

7. The method of claim 1, wherein said first time period and said second time period occur during a word clock period, said word clock period being greater or equal to four bit clock periods.

8. The method of claim 1, wherein said first number of bit clock periods corresponds to at least one bit clock period.

9. A method of operating a multi-channel digital communications link within a personal computer system, the method comprising the steps of:

(a) generating a bit clock signal and a separate frame signal adapted for data transmission requirements of a plurality of separate communications channels within the personal computer system;

wherein said plurality of separate communications channels are supported by a communications bus coupling a digital controller and a plurality of separate communications circuits within the personal computer system;

(b) communicating data words between said digital controller and one or more of said plurality of separate communications circuits using said bit clock signal and said separate frame signal;

(c) grouping data words for one or more of said separate communications channels in a multi-channel data frame such that each of said plurality of separate communications circuits can be supported with a different transmit and/or receive data rate over said communications bus;

wherein operational and/or control information for each of said plurality of separate communications circuits is embedded within each of the data words communicated through each of their respective communications channels;

wherein said frame signal is used to mark the boundary of each multi-channel data frame by having a first predetermined value for a first number of bit clock cycles at the frame beginning, and said frame signal has a second predetermined value for the rest of said multi-channel data frame.

10. The method of claim 9, wherein said operational and/or control information is transmitted asynchronously with respect to data words.

11. The method of claim 9, wherein the digital controller is located on a system motherboard of the computing system, and the separate communications circuits include at least one with an analog codec located at a position which is substantially free of electronic noise from other electronic components on said motherboard which could materially affect the operation of such analog codec.

12. A digital controller for use with an xDSL compatible modem comprising:

a) means for processing xDSL formatted data in accordance with an xDSL transmission protocol; and b) means for generating control signals associated with maintaining an xDSL compatible data link within a computer system in accordance with said xDSL transmission protocol; and c) a digital interface for coupling the digital controller to an analog codec associated with the xDSL compatible modem and, said digital interface being configured such that:

[i] a plurality of receive lines can be used for receiving xDSL data; and

[ii] a plurality of transmit lines can be used for transmitting xDSL data;

[iii] a bit clock signal line can be used for carrying a bit clock signal adapted for said xDSL transmission protocol; and

[iv] a frame signal can be used for clocking xDSL data in the form of one or more xDSL data frames transferred in parallel over said plurality of receive lines and/or said plurality of transmit lines; and

[v] a control channel is provided so that said control signals can be passed between said digital controller and said analog codec of said xDSL compatible modem within at least one bit clock signal period of said one or more xDSL data frames using said plurality of receiving lines and/or said plurality of transmitting lines; and wherein said digital controller is adapted to be physically placed on a computer motherboard.

13. The digital controller of claim 12, wherein said control signals are embedded within an xDSL data word and asynchronously transmitted with respect to xDSL data words contained in said xDSL data frames.

14. The digital controller of claim 12, wherein said digital interface can handle a multi-channel xDSL data frame, said multi-channel xDSL data frame having at least two data channels, and wherein data can be transferred through a first channel during a first time period of said multi-channel xDSL data frame, and through a second channel during a second time period of said multi-channel xDSL data frame.

15. The digital controller of claim 12, wherein said control signals relate to real time control settings for circuits located within the analog codec.

16. The digital controller of claim 12, wherein said control signals relate to power management operations to be performed by the xDSL compatible modem.

17. In a motherboard for use in a personal computing system, and which system is configured to support a plurality of separate communications channels using a multiplexed communication bus within the personal computing system, the improvement comprising:
  (A) a digital controller controlling data transfers over the multiplexed bus, said digital controller being located physically on the motherboard and including:
    [i] circuitry for processing data and control signals for each of the plurality of separate communications channels: and
  (B) an analog front end circuit associated with a first one of said plurality of separate communication channels, said analog front end circuit being electrically coupled to the multiplexed bus but physically separated from said digital controller, said analog front end circuit including:
    [i] line interface circuitry for coupling to a first data channel carrying analog data signals corresponding to first data transferred in accordance with a first communications standard and control signals associated with a first data transmission; and
    [ii] circuitry for performing A/D and D/A operations on said analog data signals and first data signals respectively; and
  (C) a digital interface for coupling said digital controller and analog front end circuit over the multiplexed bus, said digital interface including:
    [i] a plurality of data receiving lines; and
    [ii] a plurality of data transmitting lines; and
    [iii] a clock signal adapted for supporting transmission requirements of each of said plurality of separate communications channels; and
  wherein a plurality of separate control channels are implemented in time-multiplexed form over the multiplexed bus for each of said plurality of separate communications channels respectively.

18. The motherboard of claim 17, wherein said analog front end circuit is located on a xDSL modem riser card which is configured to be mounted substantially perpendicular to the motherboard.

19. The motherboard of claim 17, wherein said digital controller is controlled in part in software by a host processor located on the motherboard.

20. The motherboard of claim 17, further wherein said digital interface uses a multi-channel data frame for communicating data over the multiplexed bus, said multi-channel data frame having at least two data channels, and wherein data for said first data channel is xDSL data for an xDSL modem transferred during a first time period of said multi-channel data frame, and data for a second channel is transferred during a second time period of said multi-channel data frame.

21. The motherboard of claim 17, wherein said receive and/or transmit signal lines can also be configured to transfer asynchronous transfer mode (ATM) cells.

22. The motherboard of claim 21, wherein said ATM cells are associated with an ATM interface that is a Utopia I and/or II interface coupled to said digital controller over the multiplexed bus.

23. A method of transmitting data over a digital subscriber loop (DSL) based communications link between a DSL digital circuit section and a DSL analog circuit section comprising the steps of:
  (a) generating a DSL bit clock signal adapted for data transmission requirements of the DSL based communications link; and
  (b) transmitting DSL data over a plurality of data lines between the DSL digital circuit section and the DSL analog circuit section based on said DSL bit clock signal; and
  (c) transmitting DSL operational and/or control information over said plurality of data lines based on said DSL bit clock signal; and
  wherein said plurality of data lines are time division multiplexed such that one or more bits of said DSL operational and/or control information are embedded within each word of said DSL data transferred between the DSL digital circuit section and the DSL analog circuit section over said plurality of data lines.

24. The method of claim 23, further including a step: (d) generating a separate DSL word clock signal based on said DSL bit clock, such that a pulse of said separate DSL word clock signal is used to mark the beginning of a sample word to be transferred over the DSL based communications link.

25. The method of claim 23, wherein said DSL data includes data from digital samples and/or ATM cells.

26. The method of claim 23, wherein said DSL operational and/or control information relates to power management of a DSL modem.

27. The method of claim 23, wherein said DSL operational and/or control information relates to an interrupt for a software routine implemented as part of the digital circuit section.

28. The method of claim 23, wherein said DSL operation and/or control information includes register settings for the DSL digital circuit section and/or the DSL analog circuit section.

29. The method of claim 23, wherein said DSL operational and/or control information includes oscillator, and/or amplifier and/or filter settings for the DSL analog circuit section.

30. The method of claim 23, wherein said DSL operational and/or control information has a predetermined length.

31. The method of claim 30, wherein said predetermined length can be varied at least between a first length in bits (Nc) and a second length in bits (2Nc).

32. The method of claim 23, wherein said DSL operational and/or control information is transferred over a bus located on a computer motherboard.

33. The method of claim 27, wherein said DSL analog circuit section is part of a separate analog front end located on a modem riser card.

34. The method of claim 23, wherein one or more embedded operations channels is effectuated in the DSL based communications link.

35. A communications system incorporating an xDSL digital communications link, the communications system comprising:
  (a) a digital controller for generating xDSL transmit data to be transmitted over the xDSL digital communications link to one or more separate xDSL channels; and
  (b) a bit clock signal line for carrying a bit clock signal adapted for clocking said xDSL transmit data over the xDSL digital communications link; and
  (c) a plurality of parallel transmit signal lines, separate from said bit clock signal line, and coupled to said digital controller for communicating said xDSL transmit data in parallel over the xDSL digital communications link to said one or more xDSL channels; and
  wherein said digital controller also generates operational and/or control information that is transmitted over said xDSL digital communications link along with said xDSL transmit data, said operational and/or control information being used by the system in connection with controlling transmission of said xDSL transmit data through said one or more separate xDSL channels, and wherein the data and operational and/or control information are embedded in a plurality of words, such that each of the plurality of words includes a portion of the data and a portion of the operational and/or control information.

36. The system of claim 35 wherein said operational and/or control information is implemented as an embedded operations channel (EOC).

37. The system of claim 36 wherein said operational and/or control information is used to provide register settings and/or circuit settings for an analog front end circuit coupled to a digital subscriber loop (DSL).

38. The system of claim 35 wherein all bandwidth in said parallel transmit signal lines can be allocated to a single active channel.

39. The system of claim 35 wherein said xDSL transmit data is transmitted within a data frame that includes data for M separate channels.

40. The system of claim 39 wherein said data frame is clocked using a frame clock, which frame clock is provided on a frame clock signal line separate from said bit clock signal line.

41. The system of claim 35 wherein said xDSL transmit data includes ATM cells.

42. A method of transmitting data over a digital communications link between a digital controller and a plurality of analog CODECs supporting a plurality of respective data channels, the method comprising the steps of:

(a) generating a bit clock within a computer system bus adapted for data transmission requirements of the digital communications link;

(b) generating a separate frame signal within said computer system bus for indicating a boundary for a data frame carrying channel data for the plurality of respective data channels;

(c) communicating said channel data within said computer system bus between the digital controller and the plurality of analog CODECs based on said bit clock and said separate frame signal using time division multiplexing, such that channel data words for each of the plurality of respective data channels arc clocked at different respective portions of said data frame;

wherein a communications protocol is used so that the digital communications link supports all of said plurality of respective data channels.

43. The method of claim 42, wherein each of said plurality of respective data channels can have different transmit and/or receive data rates.

44. The method of claim 42, wherein operational control information is embedded in each data frame for said plurality of respective data channels.

45. The method of claim 44, wherein said operational control information consists of a control data word that is transmitted asynchronously.

46. The method of claim 42, wherein the digital controller section is located on a system motherboard of the computer system, and each of the plurality of analog CODECs is located at a position which is substantially free of electronic noise from other electronic components on said motherboard which could materially affect the operation of each of the plurality of analog CODECs.

47. The method of claim 42 wherein the digital controller section and the plurality of analog CODECs are used by an xDSL modem, and the digital communications link is used to support an xDSL compatible data transmission.

* * * * *

UNITED STATES PATENT AND TRADEMARK OFFICE
CERTIFICATE OF CORRECTION

PATENT NO. : 6,904,083 B2  Page 1 of 1
APPLICATION NO. : 10/054327
DATED : June 7, 2005
INVENTOR(S) : Liu et al.

It is certified that error appears in the above-identified patent and that said Letters Patent is hereby corrected as shown below:

column 13, line 9, "plurality of" should be deleted and "data lines should be changed to --data line --.

column 13, line 12, "plurality of" should be deleted and "data lines" should be changed to --data line --.

column 16, line 9, "plurality of" should be deleted and "data lines" should be changed to --data line --.

Signed and Sealed this

Fifth Day of September, 2006

JON W. DUDAS
*Director of the United States Patent and Trademark Office*